March 29, 1932.  F. D. DODGE  1,851,159
MEANS FOR CONSTRUCTING STEREOCHEMICAL MODELS
Filed March 6, 1931
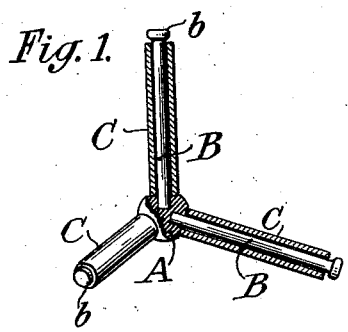
Fig. 1.
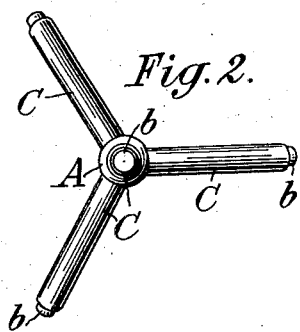
Fig. 2.
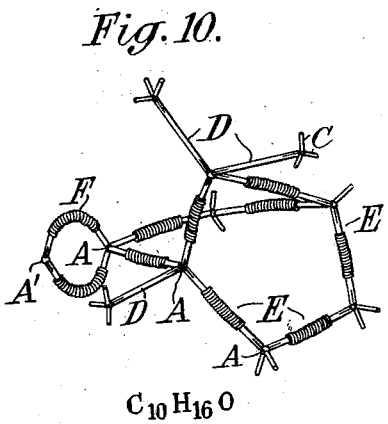
Fig. 3.
Fig. 4.
Fig. 5.  Fig. 7.
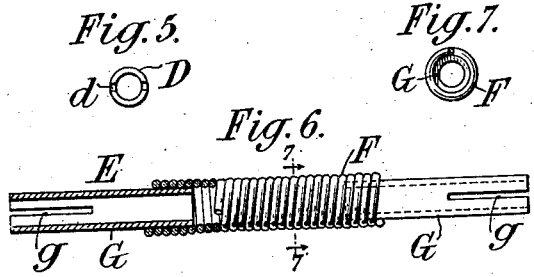
Fig. 6.
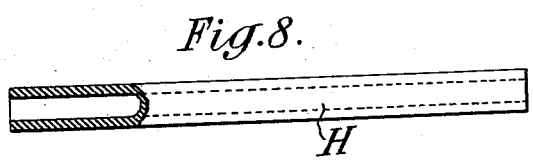
Fig. 8.
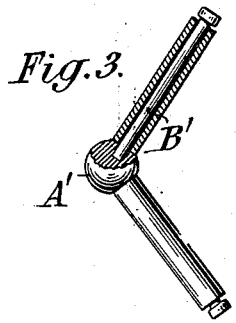
Fig. 10.
$C_{10}H_{16}O$
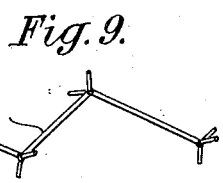
Fig. 9.
$C_4H_{10}$
Inventor
Francis D. Dodge,
By his Attorneys
Fraser, Myers & Manley.

Patented Mar. 29, 1932

1,851,159

UNITED STATES PATENT OFFICE

FRANCIS D. DODGE, OF BROOKLYN, NEW YORK

MEANS FOR CONSTRUCTING STEREOCHEMICAL MODELS

Application filed March 6, 1931. Serial No. 520,760.

The present invention relates to means for constructing stereo chemical models for demonstrating the probable spacial relationship of the atoms in molecules.

Heretofore numerous forms of models have been devised and used for demonstrating the stereo chemistry of the carbon compounds, but the use of such models has not proved entirely satisfactory. They have been mostly in the form of tetrahedra of wood, cork or other substances provided with rigid connections, they reproduced very imperfectly the conditions of strain and equilibrium which exist in carbon compound molecules, and for demonstrating the probable structure of complicated molecules are unwieldly, impracticable and misleading.

According to the present invention I provide improved forms of atomic models and connections therefor, whereby the deficiencies in, and the objections to, prior constructions are overcome. By means of my models, structures representing molecules of any size can be reproduced, and when used in the study of organic compounds my models are particularly valuable in that the connections corresponding to the chemical bonds are adapted for demonstrating compounds wherein the bonds or linkages between the atoms are relatively under no strain or are under a certain amount of strain. The nature of the models, the manner of their use and their advantages, will be better understood from the detailed description which follows and the accompanying drawings, wherein Figure 1 is a front elevation partly in section, of a model representing a carbon atom.

Fig. 2 is a top plan view of Fig. 1.

Fig. 3 is a top plan, partly in section, of a model indicating an atom of oxygen.

Figs. 4, 6 and 8 are elevations, partly in section, of models showing different forms of connecting means representing chemical bonds for joining the atomic models.

Figs. 5 and 7 are sections taken respectively along the lines 5—5 of Fig. 4 and 7—7 of Fig. 6.

Figs. 9 and 10 are perspective views of models representing molecules of different chemical compounds.

Referring first to Figs. 1 and 2 of the drawings wherein I have shown a model of a carbon atom, let A indicate the center or nucleus which may be formed of any desirable material, from which radiates four arms or pins B, the angle between any pair of arms being approximately 109°, which corresponds to the theoretical angle between the normals to the faces of a regular tetrahedron. Mounted on each arm B and closely fitting thereover so as to be freely rotatable thereon, is a sleeve or bushing C which is held against removal from said pins by an enlargement $b$ at the end of each pin, which may be provided by upsetting the latter or securing in any other manner a head thereon. The enlargement $b$, it will be understood, is of smaller diameter than the sleeve C, for a purpose which will be presently made apparent.

In Fig. 3, which represents an atom of oxygen, the model consists of a nucleus A' similar to A in Figs. 1 and 2, and a pair of radiating arms B' disposed to provide an angle of approximately 109° therebetween. In all other respects the structural details of the model are the same as that disclosed in Figs. 1 and 2. In each of these atomic models it will thus be seen that the nucleus is rotatable about the axis of any of the arms, a feature of the invention which permits of the assembled molecular model, when suspended by wires or cords, to assume a position of equilibrium.

Figs. 4 to 8 illustrate different means which represent chemical bonds for connecting the atoms together. These are preferably of standard length and normally straight. In Fig. 4 this connecting means, which is designated by the reference character D, is formed from a metal tube and has its ends longitudinally slitted, as indicated at $d$, whereby to provide a certain amount of resiliency in said ends so that when such end is pushed over a sleeve C on a pin B, it will frictionally engage the same and serve to connect said members together. In Fig. 6 the connecting member, which I have designated E, consists of a closely wound central spring member F, into the ends of which are fitted and held tubular metal sections G, G, each of which is longitudinally slitted, as indicated at $g$, in a manner similar to that illustrated in Fig. 4. The connecting members E are normally straight, but are capable of being strained into arched form to provide a connection between the arms of atoms which are not in alignment. In Fig. 8 the connecting means H is in the form of a rubber tubular element which normally has sufficient rigidity to maintain it straight, but which, like the spring F, is capable of being strained into arched form. The internal diameter at the ends of said tubular member element is such as will render it capable of frictionally engaging the bushing on an arm of an atomic member.

In molecules of the aliphatic series or in cyclic molecules having six or more atoms in the ring, that is, in strainless compounds, any of the connecting elements D, E or H may be employed, and when so used will retain their normally straight form. In the cases of molecules having three, four or five atoms in a ring, or in bi- and tri-cyclic combinations, the connection between the atoms are preferably made with the spring or rubber connecting elements E and H, which permit arching of the linkages, thus indicating a certain amount of strain therein.

The rotating sleeve or swivel connection between the nucleus about the axis of any arm permits free rotation of any atom or group of atoms about the line connecting their centers, thus reproducing the conditions apparently existing in actual molecules. This is best illustrated in Fig. 9, which represents a model of butane ($C_4H_{10}$), the free ends of the arms each representing a hydrogen atom. In cyclic and poly-cyclic structures this possibility of rotation allows the complete model automatically to assume the configuration of least strain, which adjustment is not obvious in rigid models.

In cyclic molecules wherein a condition of strain exists between the atoms, the elastic linkages serve to illustrate this condition remarkably well. This is plainly demonstrated in Fig. 10, which illustrates a molecule of camphor ($C_{10}H_{16}O$). The slight strain in the linkages between the carbon atoms A in this molecule is apparent from the slight curvature in the springs F of the linkages E connecting certain of said carbon atoms.

The value of such molecular models has been frequently impressed upon the applicant, and it may be safely stated that if a given structural formula cannot be easily reproduced with the models, it is an impossible, or at least a highly improbable formula. In the development of the chemistry of the terpene series, for example, many formulæ were proposed which were not reproducible with models, and much time and energy could have been saved if this point had been considered. The formulæ that have survived and are now generally accepted, are, without exception, only those that the models show to be possible and plausible.

From the foregoing detailed description it will be apparent that the models as hereinbefore described will be found instructive and suggestive in the field of the terpenes and camphors, of the sugars and their derivatives, and in the study of many of the alkaloids, etc.

The models are small and light, which characteristics permit of almost indefinite extension in complicated molecules. For examples, in the use of said molecules for the sesqui terpenes or the more complex sugars where fifteen or eighteen carbon atoms are involved, the assembled model may be conveniently suspended by wires or cords, thereby permitting the model to assume the position of equilibrium.

While I have shown and described certain preferred embodiments of my invention and the specific application thereof to atoms of carbon and oxygen, it will be apparent that the concept underlying the present invention is equally applicable to the other elements whether they have a valence of one or more. It will also be appreciated that to more readily differentiate and define the atoms in any built-up molecular structure, the nuclei of the atoms may be differently colored. Hence I do not wish to be limited to the details of construction set forth, since the same may be modified without departing from the spirit of the invention.

What I claim is:

1. Means for constructing stereo chemical models comprising members representing atoms and members representing chemical bonds for joining atoms, said members having cooperating parts for detachably connecting said members together, the bond members being normally straight but capable of being strained into arched form to provide a connection between two members representing atoms.

2. Means for constructing stereo chemical models comprising members representing atoms and members representing chemical bonds for joining atoms, said members having cooperating parts for detachably connecting said members together in a manner to permit free rotation of a member representing an atom with respect to a bond member, the bond members being normally straight but capable of being strained into arched form to provide a connection between two members representing atoms.

3. Means for constructing stereo chemical models comprising members representing atoms, said members each having a nuclear body and radiating arms corresponding in number to the valence of the atom, the nuclear body being secured to the radiating arms and rotatable about the axis of an arm.

4. Means for constructing stereo chemical models comprising members representing atoms, said members each having a nuclear body and radiating arms corresponding in number to the valence of the atom, the nuclear body being secured to the radiating arms and rotatable about the axis of any of the arms.

5. Means for constructing stereo chemical models comprising members representing atoms, said members each having a nuclear body and a plurality of radiating arms corresponding in number to the valence of the atom, the angle between any pair of arms being equal, the nuclear body being secured to the radiating arms and rotatable about the axis of an arm.

6. Means for constructing stereo chemical models comprising members representing atoms, said members each having a nuclear body and rigid pins radiating therefrom, and an element carried by and swively mounted on each pin.

7. Means for constructing stereo chemical models comprising members representing atoms, said members each having a nuclear body and rigid pins radiating therefrom, and a sleeve swively mounted on each pin.

8. Means for constructing stereo chemical models comprising a member representing a carbon atom having a nuclear body and four arms radiating from said nucleus, the angle between any pair of arms being approximately 109°, the nuclear body being rotatable about the axis of any of the arms.

9. Means for constructing stereo chemical models comprising a member representing a carbon atom having a nuclear body and four arms radiating from nuclear body, the length of said arms being equal and the angle between any pair of arms being approximtely 109°.

10. Means for constructing stereo chemical models comprising members representing atoms and members representing chemical bonds for joining atoms, said members representing atoms each comprising a nuclear body and a plurality of radiating arms corresponding in number to the valence of the atom, and said bond members being of equal length and normally straight, the ends of the bond members being adapted to frictionally engage the radiating arms of the members representing atoms to connect such members together.

11. Means for constructing stereo chemical models comprising members representing atoms and members representing chemical bonds for joining atoms, said members representing atoms each comprising a nuclear body and a plurality of radiating arms corresponding in number to the valence of the atom, the nucleus being rotatable about the axis of an arm, and said bond members being of equal length and normally straight, but capable of being strained into arched form, the ends of the bond members being adapted to frictionally engage the radiating arms of the members representing atoms to connect such members together.

12. Means for constructing stereo chemical models comprising members representing chemical bonds, said members each being normally straight and having a portion intermediate its ends which is deformable under strain, and the ends of said members being capable of frictionally engaging an element which the member is adapted to hold.

13. Means for constructing stereo chemical models comprising members representing chemical bonds, said members being normally straight and having a portion intermediate their ends which is deformable under strain, the ends of each of said members being tubular and capable of frictionally engaging an element which the member is adapted to hold.

In witness whereof, I have hereunto signed my name.

FRANCIS D. DODGE.